United States Patent
Chmielewski

(10) Patent No.: US 12,325,344 B2
(45) Date of Patent: Jun. 10, 2025

(54) LARGE ANIMAL HAULING VEHICLE WITH SUPPLEMENTAL ANIMAL STABILITY SYSTEM

(71) Applicant: Laurance Chmielewski, Kewaskum, WI (US)

(72) Inventor: Laurance Chmielewski, Kewaskum, WI (US)

(73) Assignee: Laurance Chmielewski, Kewaskum, WI (US)

( * ) Notice: Subject to any disclaimer, the term of this patent is extended or adjusted under 35 U.S.C. 154(b) by 2 days.

(21) Appl. No.: 18/086,171

(22) Filed: Dec. 21, 2022

(65) Prior Publication Data

US 2023/0202375 A1 Jun. 29, 2023

Related U.S. Application Data

(60) Provisional application No. 63/294,572, filed on Dec. 29, 2021.

(51) Int. Cl.
*B60P 3/04* (2006.01)
*B60P 7/135* (2006.01)
*B60P 7/16* (2006.01)

(52) U.S. Cl.
CPC ............ *B60P 3/04* (2013.01); *B60P 7/135* (2013.01); *B60P 7/16* (2013.01)

(58) Field of Classification Search
CPC .. B60P 3/04; B60P 7/065; B60P 7/135; B60P 7/16; A01K 1/0035; A01K 1/0272
USPC ......................................... 180/274; 119/400
See application file for complete search history.

(56) References Cited

U.S. PATENT DOCUMENTS

| 3,098,455 | A | * | 7/1963 | McElroy | B61D 45/008 |
| | | | | | 410/125 |
| 3,915,096 | A | * | 10/1975 | Salisbury | B61D 45/006 |
| | | | | | 410/125 |
| 6,746,190 | B2 | * | 6/2004 | Freeman | B60P 7/065 |
| | | | | | 410/125 |
| 9,994,182 | B1 | * | 6/2018 | Jaradi | B60R 21/2338 |
| 10,343,642 | B2 | * | 7/2019 | Faruque | B60R 21/214 |
| 11,059,448 | B2 | * | 7/2021 | Rutelin | B60R 21/216 |
| 11,975,675 | B2 | * | 5/2024 | Faruque | B60R 21/2338 |
| 2007/0017457 | A1 | * | 1/2007 | Jackson | A01K 1/0236 |
| | | | | | 119/843 |
| 2011/0132277 | A1 | * | 6/2011 | McAtamney | A01K 1/0272 |
| | | | | | 119/752 |
| 2018/0215338 | A1 | * | 8/2018 | Faruque | B60R 21/264 |
| 2018/0361981 | A1 | * | 12/2018 | Faruque | B60R 21/232 |

(Continued)

*Primary Examiner* — Paul N Dickson
*Assistant Examiner* — Caitlin Anne Miller
(74) *Attorney, Agent, or Firm* — Boyle Frederickson S.C

(57) ABSTRACT

A large animal hauling vehicle is provided that has a supplemental animal stability system. The supplemental support system offers protection or otherwise helps the large animal remain stable during driving situations that could lead to the animal's instability. These situations by may include abrupt movements of the hauling vehicle, such as pronounced or increasing trailer sway situations or crash events. The instability protection system may include a support system with at least one deployable device, such as an inflatable cushion(s) and a control system that evaluates operational conditions and commands deployment of the deployable device(s) upon a determination of an instability condition.

9 Claims, 7 Drawing Sheets

(56) References Cited

U.S. PATENT DOCUMENTS

2019/0217804 A1* 7/2019 Cho .................. B60R 21/233
2020/0062210 A1* 2/2020 Fukawatase .......... B60R 21/231

* cited by examiner

LARGE ANIMAL HAULING VEHICLE WITH SUPPLEMENTAL ANIMAL STABILITY SYSTEM

CROSS-REFERENCE(S) TO RELATED APPLICATION(S)

This application claims the benefit of priority of U.S. Provisional Patent Application Ser. No. 63/294,572, filed Dec. 29, 2021 and entitled Large Animal Hauling Vehicle with Supplemental Animal Stability System, the entirety of which is hereby incorporated by reference.

BACKGROUND OF THE INVENTION

Field of the Invention

The present invention relates to large animal hauling vehicles such as trailers, van body trucks, and the like and, more particularly, to a hauling vehicle with a supplemental animal stability system for protecting the large animal(s) being transported.

Discussion of the Related Art

Large animals such as horses, cattle, llamas, and the like, can be transported in a variety of hauling vehicles. Hauling vehicles include towed vehicles that may be implemented in a variety of configurations, including bumper-pull trailers, gooseneck trailers, and semi-tractor trailers. Besides trailers, large animals can also be transported in other types of hauling vehicles, such as van-body trucks.

Some hauling vehicles are relatively simplistic or more general-purpose type(s), such as stock trailers, with a single open compartment or multiple compartments that are typically arranged longitudinally and separated by a transversely extending gate(s). separated large open compartments. In stock trailers, multiple large animals can be transported in each of the compartments, often untied or unrestrained. This allows animals in a common compartment to have free access to each other, making them susceptible to injuring each other either through purposeful or accidental interactions.

Other hauling vehicles of more purpose-built types, such as horse trailers or horse box trucks, have various separation or other safety features that offer more protection to the large animals being hauled than the more open stock trailers. These separation or other safety features include, for example, as chest and rear restraint bars, divider walls, resilient floor mats, and padded side walls or other padded components.

Although such purpose-built hauling vehicles offer more protection to the large animals being transported, the compartments for the individual animals are still configured to be relatively non-restrictive and spacious because tightly restraining large animals can stress them. Correspondingly, if the hauling vehicle experiences instability, the large animal(s) being hauled can struggle to maintain its own stability, which may lead to injury. This is further complicated if the hauling vehicle is involved in an accident, in which case the large animal(s) may experience substantial forces, for example, colliding with structures in the hauling vehicle, making injury more likely.

Trying to offer active safety systems to protect large animals during vehicle accidents presents numerous challenges. Although airbag systems for passenger vehicles are known, vehicular airbag deployments produce loud sounds through the activation and burning of their propellant and rapid inflation, typically between about 25 to 50 milliseconds, with the material of the airbag traveling at high velocities of up to 200 mph (miles per hour) during inflation. However, loud sounds and slapping-type contact with large animals can spook or otherwise greatly stress them.

SUMMARY AND OBJECTS OF THE INVENTION

The invention provides a large animal hauling vehicle with a supplemental animal stability system that offers protection to large animals during instability-inducing situations while hauling or transporting.

The instability protection system may include a support system with at least one deployable device, such as an inflatable airbag(s), curtains(s), or cushion(s). The inflatable cushion may be inflated in a manner that is substantially quieter than solid propellant inflators used in passenger vehicles. This may be done by, for example, releasing a stored compressed gas, such as $CO_2$ in a $CO_2$ canister(s), to inflate the airbag(s), curtains, or cushion. A control system that evaluates operational conditions and commands deployment of the deployable device(s) upon a determination of an instability condition.

These, and other aspects and objects of the present invention, will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which.

However, it is not intended that the invention be limited to the specific terms so selected, and it is to be understood that each specific term includes all technical equivalents, which operate in a similar manner to accomplish a similar purpose. For example, the words "connected", "attached", "coupled", or terms similar thereto are often used. They are not limited to direct connection but include connection through other elements where such connection is recognized as being equivalent by those skilled in the art.

DETAILED DESCRIPTION OF PREFERRED EMBODIMENTS

Figure 1:
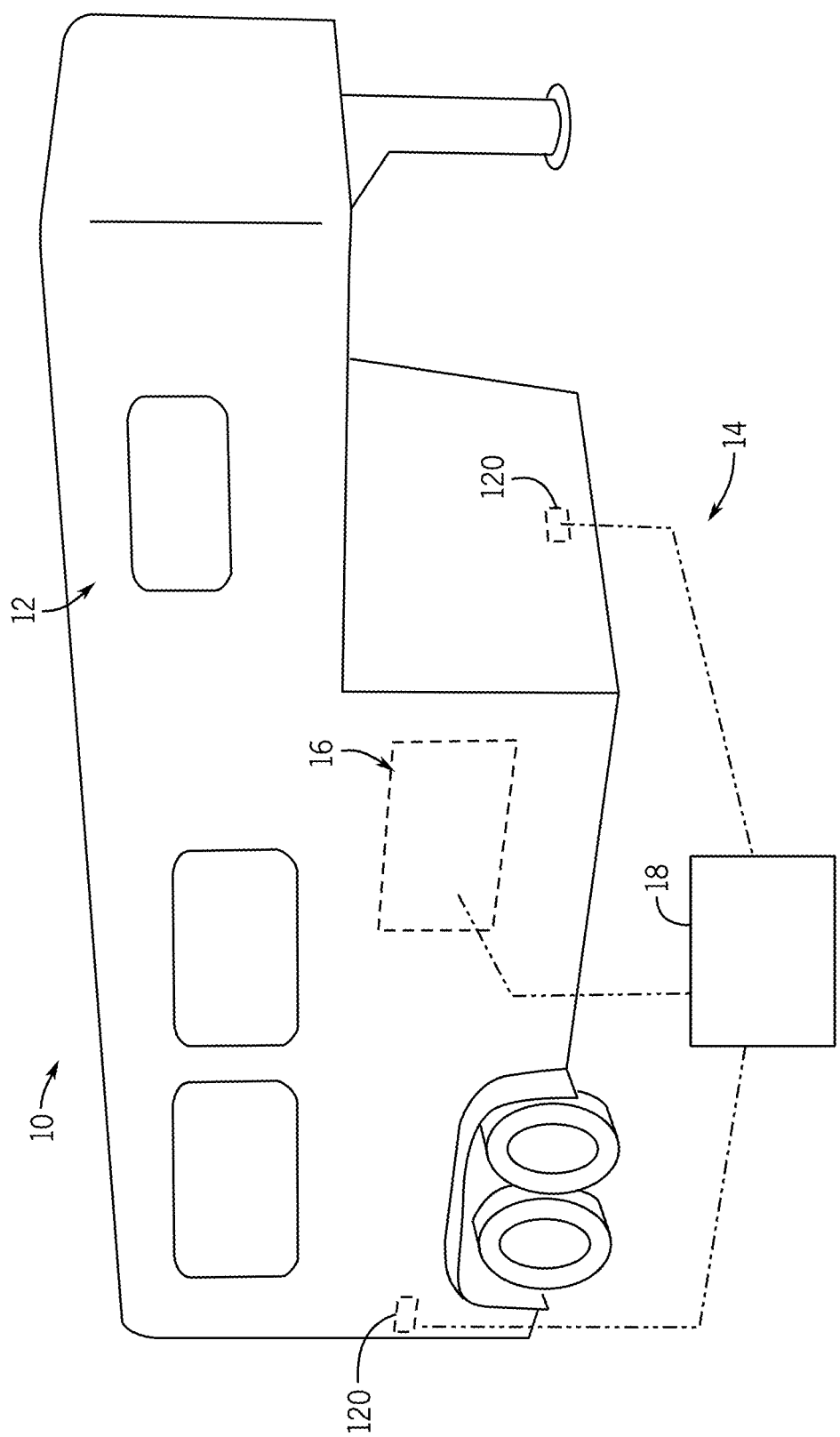
FIG. 1 is a perspective view of a trailer having a large animal hauling vehicle with supplemental animal stability system of the present invention.

Referring to FIG. 1, a supplemental animal stability system is shown implemented in a large animal hauling vehicle 10, shown here as trailer 12. Although trailer 12 is shown as a gooseneck trailer, it is understood that it may be any of a variety of towed vehicles, including bumper pull trailers or semi-tractor trailers, or non-towed vehicles such as a van-body truck or other box-type truck. Trailer 12 is shown as a straight load horse trailer, although it is understood that trailer 12 may be configured as other types of horse trailers such as slant load trailers or other types of large animal trailers such as stock trailers. The supplemental animal stability system 14 is configured to enhance an animal's stability while enduring various instability-inducing events in the trailer 12. Supplemental animal stability system 14 includes support system 16 and control system 18 that cooperate to provide crash protection or other temporary support enhancement that reduces an animal's reliance on its own ability to maintain a safe position within trailer 12 during emergency maneuvers, vehicle instability events, or other potentially dangerous situations which could compromise the animal's ability to stand in a safe position or avoid colliding with structures inside the trailer.

Figure 2:
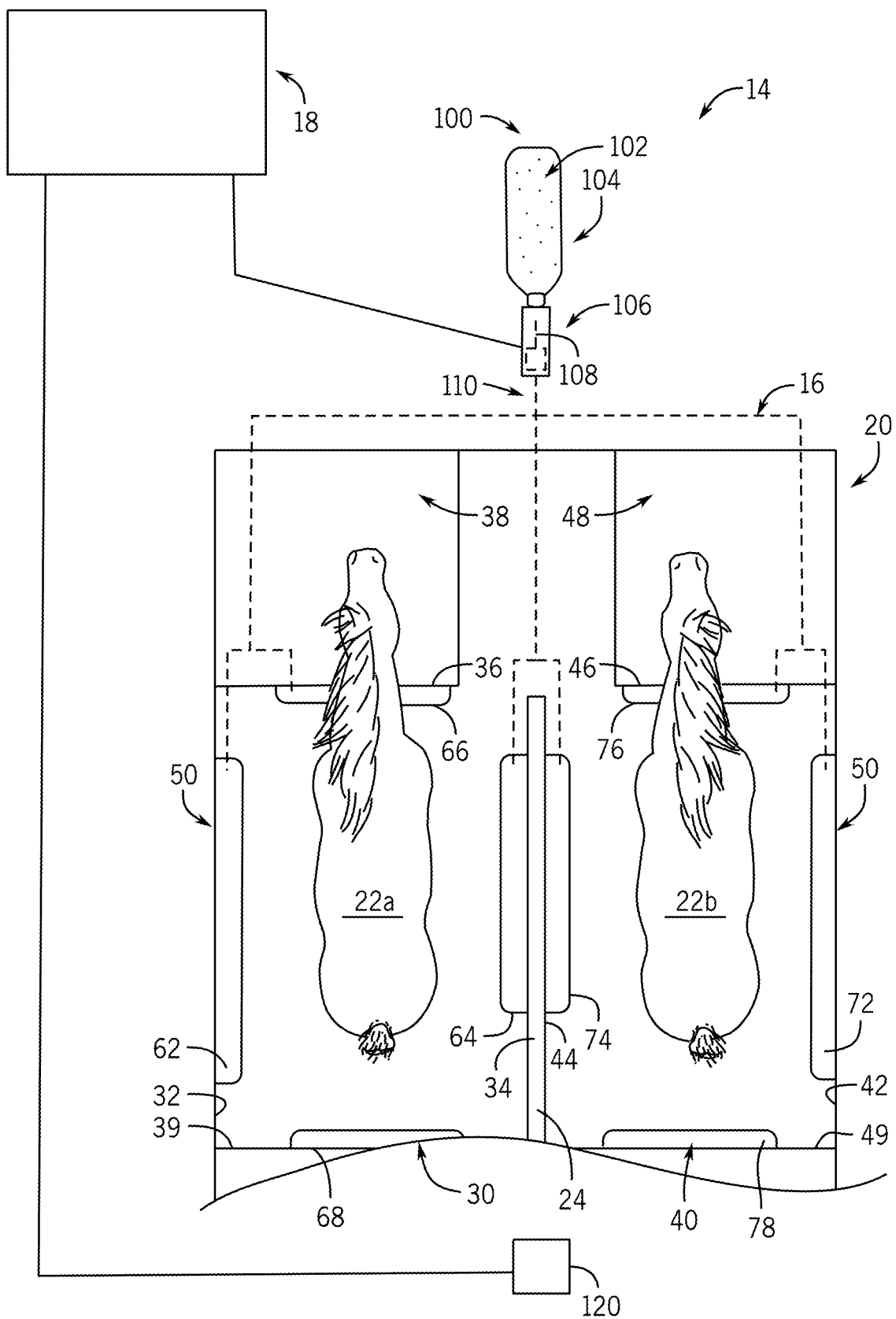
FIG. 2 is a cutaway top plan view of the large animal hauling vehicle with supplemental animal stability system of FIG. 1 in a resting state.

Referring now to FIG. 2, the trailer 12 (FIG. 1) or other large animal hauling vehicle 10 (FIG. 1) has an animal transport compartment 20 in which a large animal(s), shown here as horse(s) 22a, 22b is loaded for moving the horse 22a, 22b in the vehicle during a transportation session. The animal transport compartment 20 defines an enclosure with multiple interconnected walls. Compartment 20 may be substantially open, such as a box stall configuration, or provide different divided areas for different horses 22a, 22b, such as those shown in FIG. 2 that are separated from each other by divider wall 24. Each of the two areas shown in this example has a pair of side walls and a front wall. As shown toward the left, a first area 30 is defined between a first side wall 32 corresponding to a first side wall of the trailer 12 and a second side wall 34 is defined at a first surface of divider wall 24 that faces horse 22a. Front wall 36 is shown here as a wall segment of a manger 38 that faces rearwardly, toward horse 22a. Rear wall 39 is arranged toward the back of the first area 30 and may be defined at, for example, a separating wall of trailer 12 or doors at the back of trailer 12. As shown toward the right, a second area 40 is defined between a first side wall 42 corresponding to a second side wall of the trailer 12 and a second side wall 44 is defined at a second surface of divider wall 24 that faces horse 22b. Front wall 46 is shown here as a wall segment of manger 48 that faces rearwardly, toward horse 22b. Rear wall 49 is arranged toward the back of the second area 40 and may be defined at, for example, a separating wall of trailer 12 or doors at the back of trailer 12.

Still referring to FIG. 2, support system 16 includes one or more deployable devices 50, shown here as airbags, curtains, cushions, or inflatable panels 62, 64, 66, 68 are stored in respective enclosures in the first area 30 and inflatable panels 72, 74, 76, 78 are stored in respective enclosures in the second area 40. Support system 16 further provides an inflation system 100 that is configured to deploy the deployable devices 50, typically by inflation, as controlled by control system 18. Inflation system 100 typically is typically configured as a non-propellant or non-ignition/burning system. Inflation system 100 is shown here as utilizing a compressed gas 102, typically $CO_2$, represented here as stored in a pressurized state in canister 104. Activation mechanism 106 is mounted to canister 104 and may include a release device, shown here as puncture tool 108. The puncture tool 108 includes a needle or other sharp projection that is configured to pierce a seal at the end of canister 104 to release the compressed gas 102 to flow through passages such as tubing 110 into the inflatable panels 62, 64, 66, 68, 72, 74, 76, 78 during the deployment or inflation commanded by in control system 18. Although a single canister 104 is shown, it is understood that each or more than one of inflatable panels 62, 64, 66, 68, 72, 74, 76, 78 may have its own canister of compressed gas. In such multiple canister configurations, a corresponding number of activation mechanisms 106 are provided and controlled by control system 18, with a corresponding reduction in the amount of tubing 110.

Still referring to FIG. 2, control system 18 commands the deployment or inflation in response to a detected instability condition of the trailer 12 (FIG. 1) or other vehicle 10 (FIG. 1). Control system 18 may include a controller such as a computer that executes various stored programs while receiving inputs from and sending commands to control the actuation of various components, such as energizing the activation mechanism 106 to actuate the puncture tool 108. Control system 18 includes a sensor(s) 120 that is configured to detect the instability condition of the vehicle. Sensor 120 may be or include, for example, an accelerometer that is able to detect and provide a corresponding signal for situations that correspond to instability conditions, such as a back-and-forth trailer sway events and/or crash events.

Figure 3:
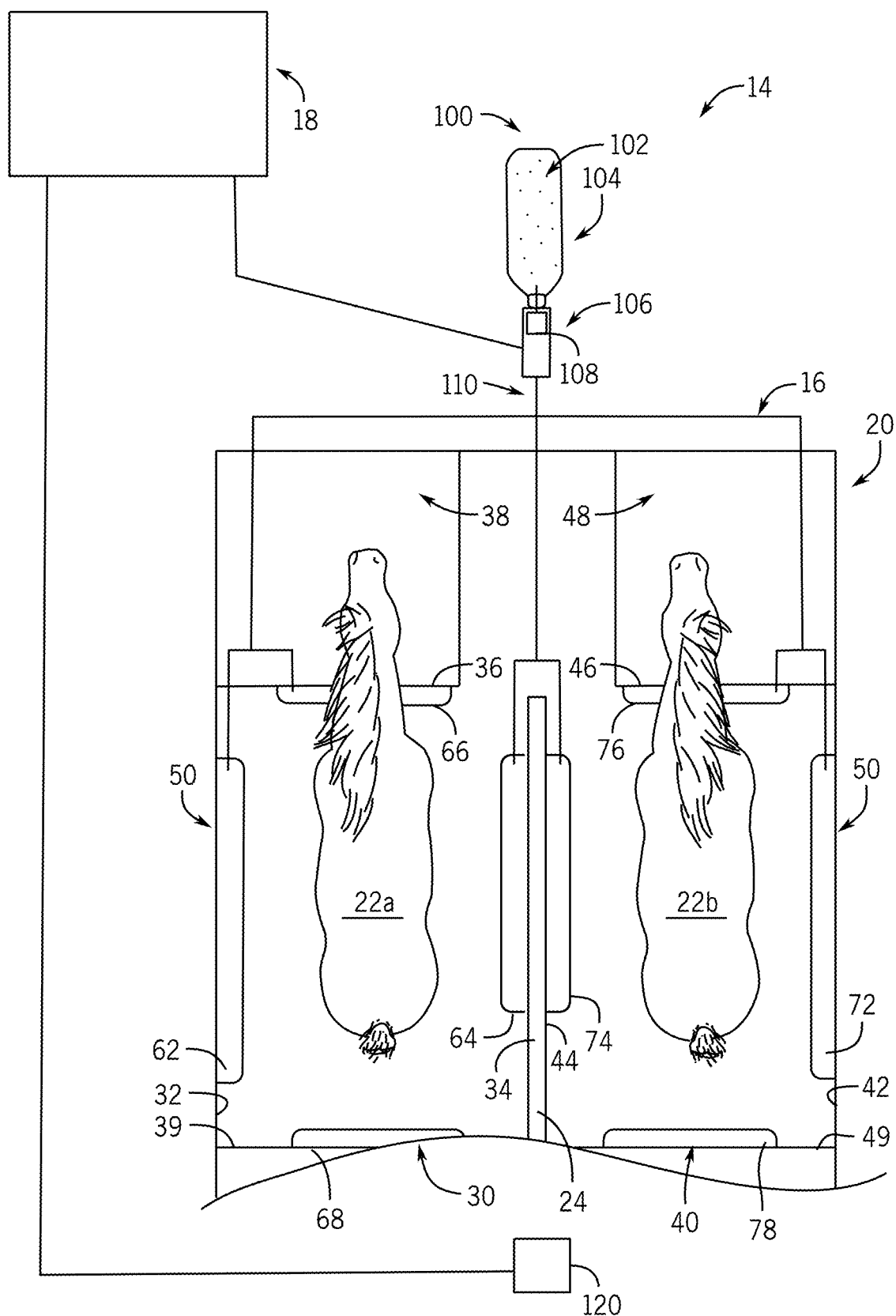
FIG. 3 is a cutaway top plan view of the large animal hauling vehicle with supplemental animal stability system of FIG. 1 in an initial release state.
Figure 4:
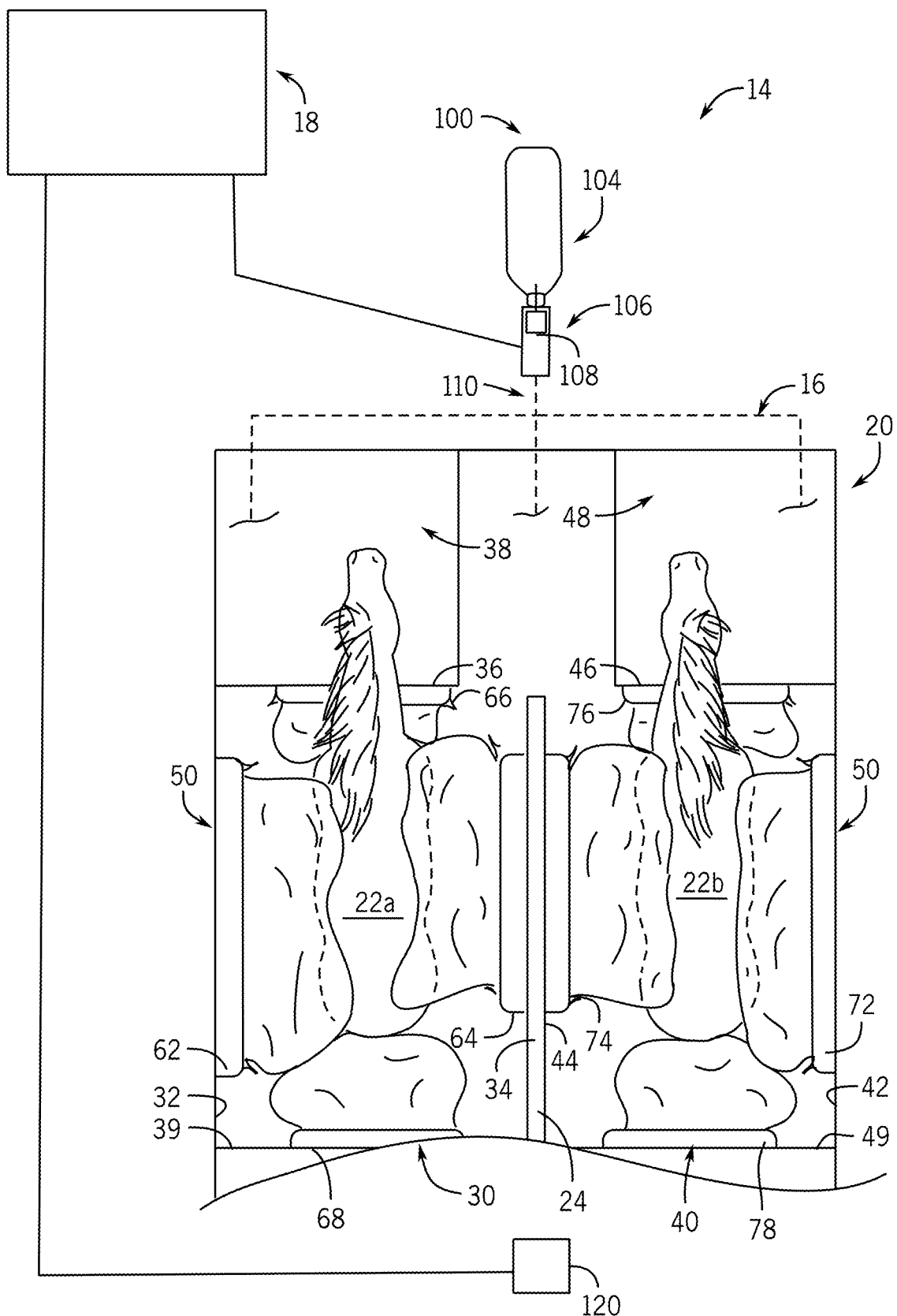
FIG. 4 is a cutaway top plan view of the large animal hauling vehicle with supplemental animal stability system of FIG. 1 in a deployed state.

Referring generally to FIGS. 2-4, these generally show the system 14 is different operational states. FIG. 2 shows a default or resting state of system 14, in which the inflation system 100 has a charged canister 104 of gas 102. The activation mechanisms 106 is in its default or resting state, which may include holding a spring or other biasing device in a loaded or energy-stored state. FIG. 3 shows an initial release state of system 14. This occurs after the sensor 120 detects the instability condition. Command system command the activation mechanism 106 to actuate the puncture tool 108, which pierces the seal at the end of canister 104 to release the gas 102 through tubing 110 and inflate the inflatable panels 62, 64, 66, 68, 72, 74, 76, 78. The activation mechanisms 106 is in its default or resting state, which may include holding a spring or other biasing device in a loaded or energy-stored state. FIG. 4 shows the shows a deployed state of system 14, in which the inflatable panels 62, 64, 66, 68, 72, 74, 76, 78 have been deployed or inflated, with respective surface of their bags or cushions engages respective portions of the horse's 22a, 22b anatomy to provide supplemental support.

Figure 5:
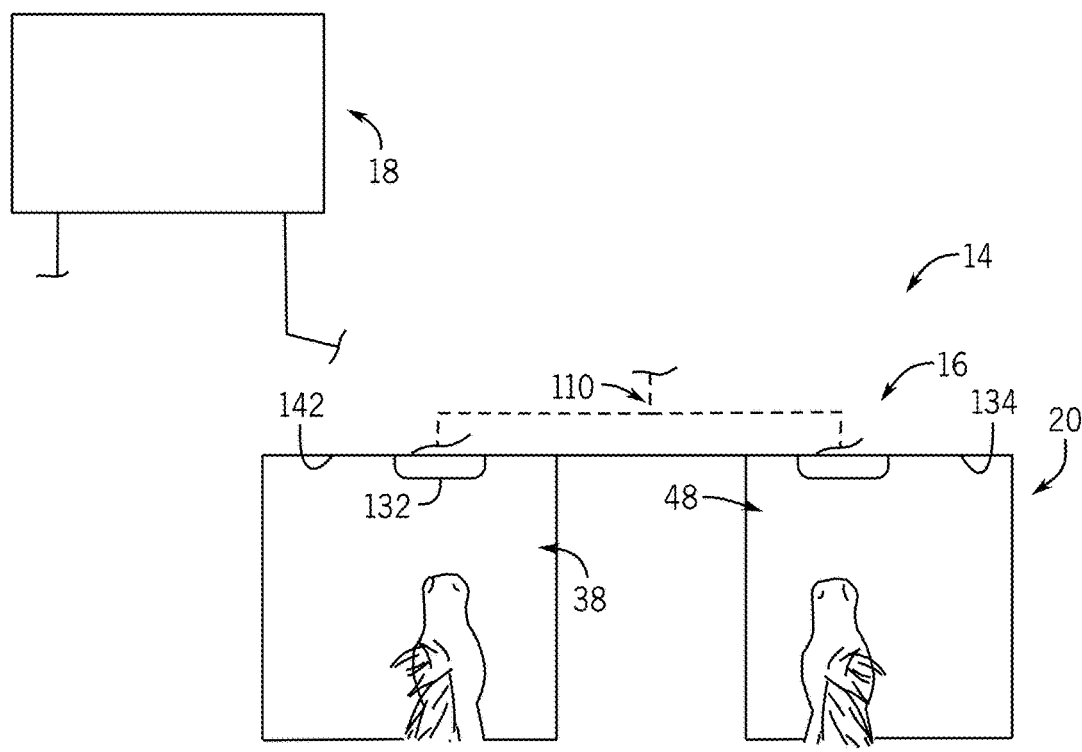
FIG. 5 is a view of the large animal hauling vehicle with supplemental animal stability system of FIG. 1 with inflatable cones in a non-deployed state.
Figure 6:
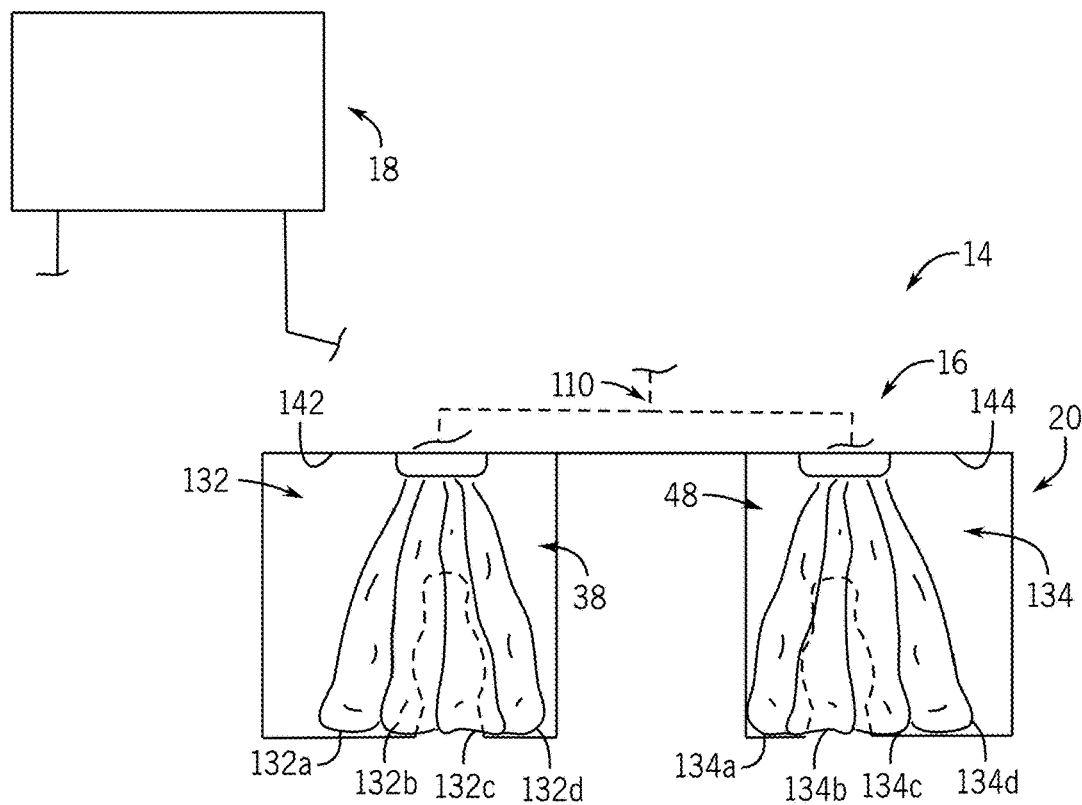
FIG. 6 is a view of the large animal hauling vehicle with supplemental animal stability system of FIG. 1 with the inflatable cones in a deployed state.

FIGS. 5-6 show a version of support system 16 that includes selectively deployable head supports, shown as inflatable cones 132, 134. Like the inflatable panels 62, 64, 66, 68, 72, 74, 76, 78 in the first and second areas 30, 40 (FIGS. 2-4), inflatable cones 132, 134 are connected to the inflation system 100. Control system 18 selectively commands the inflation system 100 to deploy the inflatable cones 132, 134 during detected situations of vehicle instability. FIG. 5 shows the inflatable cones 132, 134 in their non-deployed state in their respective enclosures mounted to front manger walls 142, 144. FIG. 6 shows the inflatable cones 132, 134 in their deployed state or inflated state, released from their enclosures. As shown in FIG. 6, inflatable cones 132, 134 may include interconnected segments, some of which are shown as cone segments 132a, 132b, 132c, 132d and 134a, 134b, 134c, 134d. In this implementation, each of the inflatable cones 132, 134 defines a smallest diameter portion at the front of the cone(s) or toward the respective front manger wall 142, 144. A largest diameter portion of this version is defined at the back of the cone(s) or away from the respective front manger wall 142, 144.

Figure 7:
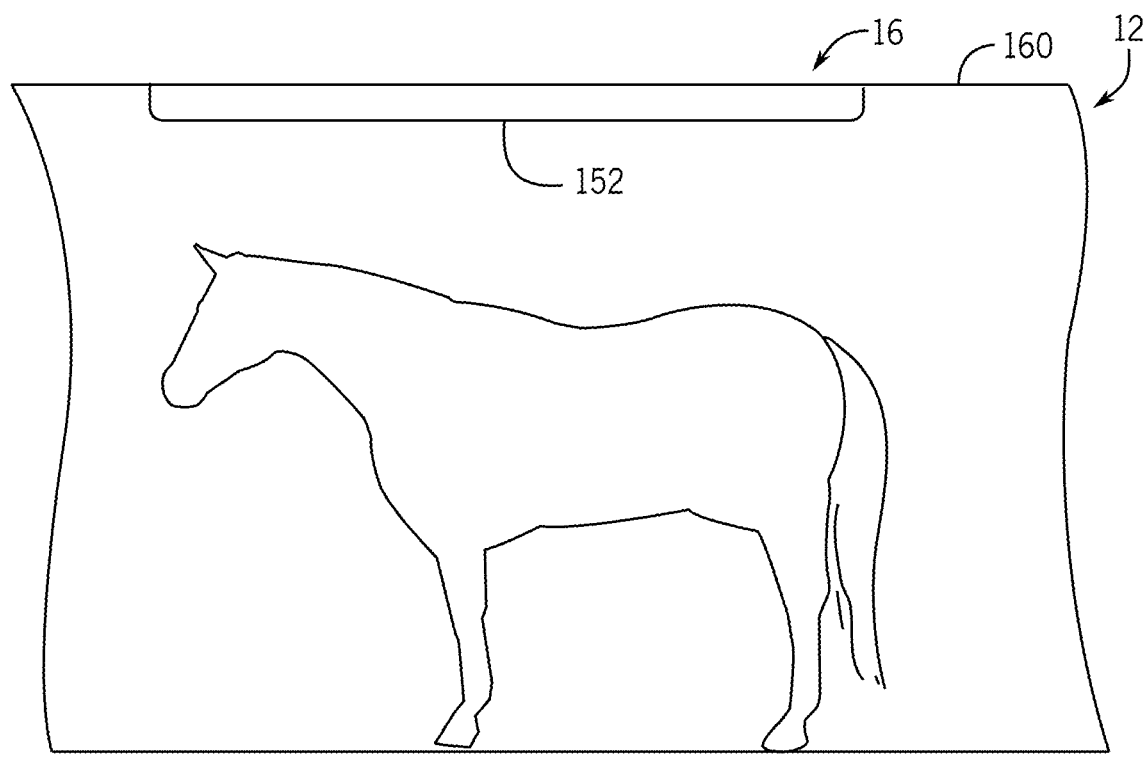
FIG. 7 is a side elevation view of the large animal hauling vehicle with supplemental animal stability system of FIG. 1.
Figure 8:
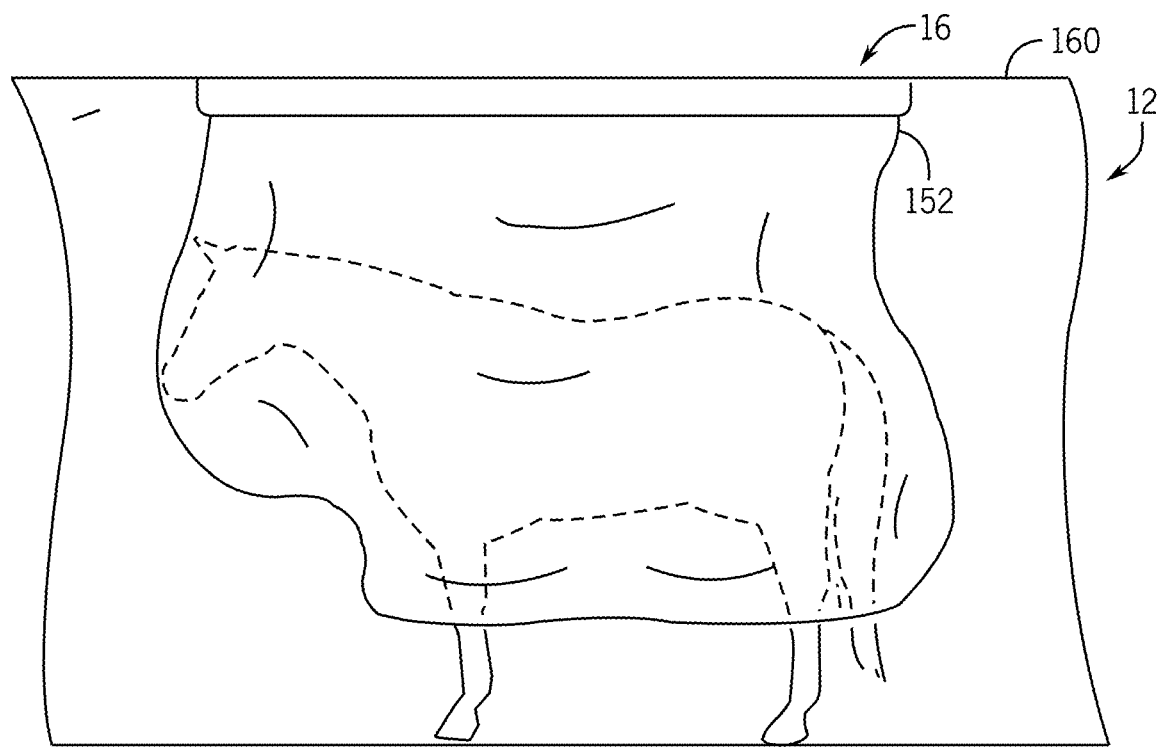
FIG. 8 is a side elevation view of the large animal hauling vehicle with supplemental animal stability system of FIG. 1 having selectively deployable upper supports deployed.

FIGS. 7-8 show a version of support system 16 that includes selectively deployable upper supports, shown as inflatable panel 152. Like the inflatable panels 62, 64, 66, 68, 72, 74, 76, 78 in first and second areas 30, 40 (FIGS. 2-4), inflatable panel 152 is connected to the inflation system 100. Control system 18 selectively commands the inflation system 100 to deploy the inflatable panel 152 during detected situations of vehicle instability. FIG. 7 shows the inflatable panel 152 in its non-deployed state in an enclosures mounted to a top wall 160 or ceiling of trailer 12 FIG. 8 shows the inflatable panel in its deployed state or inflated state, released from its ceiling-mounted enclosure. Multiple ceiling-mounted inflatable panels 152 may be implemented in a single area 30, 40 (FIGS. 2-4), which may allow, for example, a pair of panels 152 to deploy on opposites sides of the horse, providing a temporary energy-absorbing barrier between each of the horse's sides and respective rigid wall structures. In another implementation, a single ceiling-mounted inflatable panel 152 may deploy directly over the horse and have a pair of transversely spaced inflatable flaps that release and inflate between the horse horse's sides and respective rigid wall structures.

Figure 9:
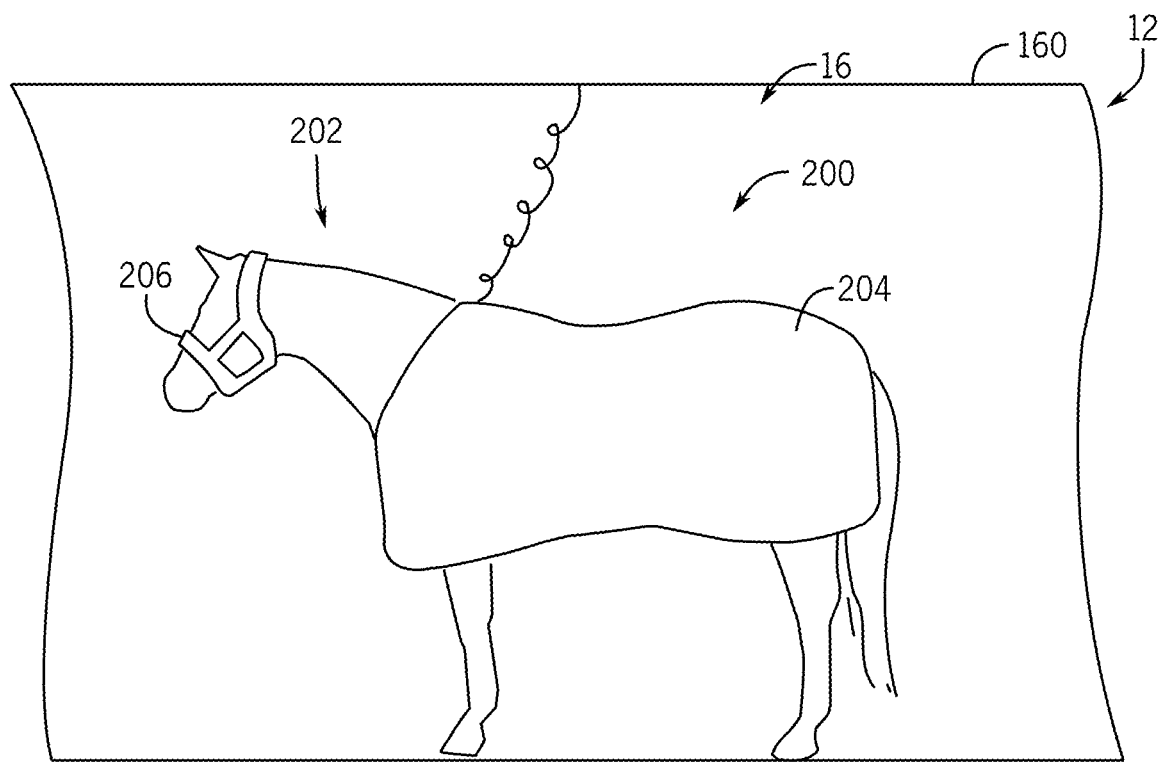
FIG. 9 is a side elevation view of the large animal hauling vehicle with supplemental animal stability system of FIG. 1 with the inflatable panel and cone in non-deployed states.
Figure 10:
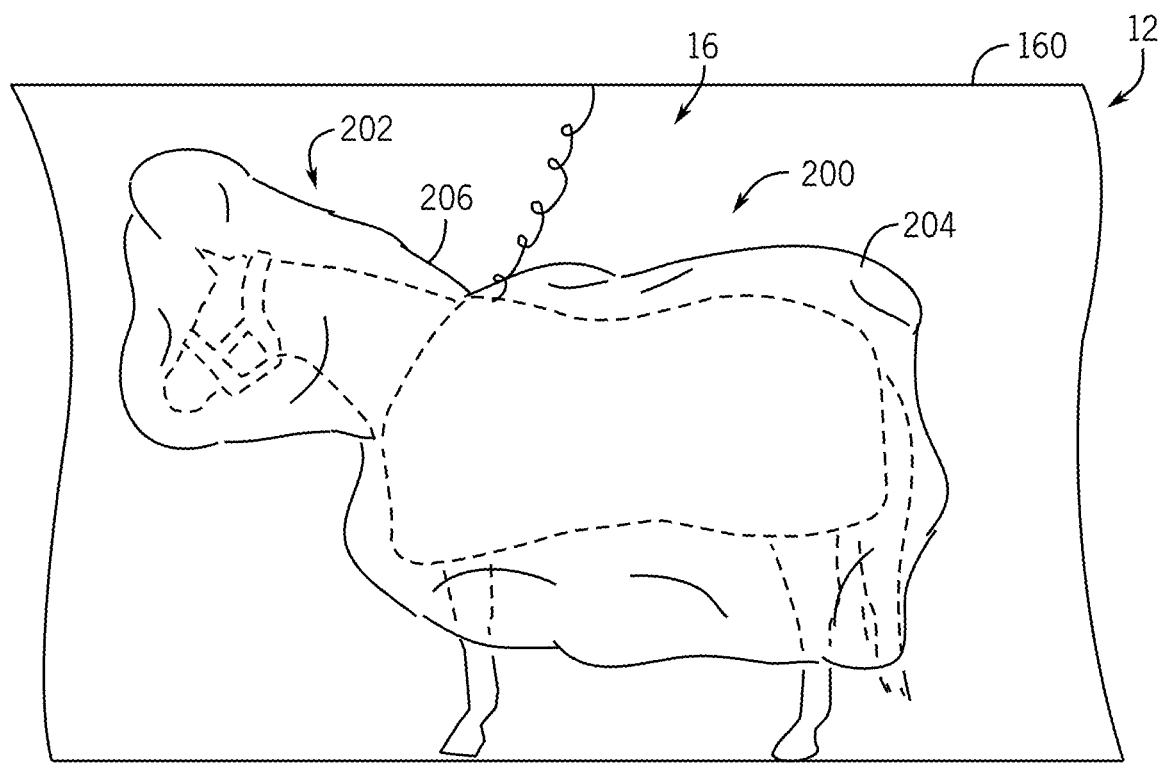
FIG. 10 is a side elevation view of the large animal hauling vehicle with supplemental animal stability system of FIG. 1 with the inflatable panel and cone in deployed states.

FIGS. 9-10 show a version of support system 16 that is wearable by the horse. This is shown here as body support 200 and head support 202. Body support is represented as inflatable cushion or panel 204 that is held in its non-deployed or resting state in an enclosure defined by, e.g. a horse sheet or blanket. Head support is represented as inflatable cone 206 that is held in its non-deployed or resting state in an enclosure defined by, e.g. a horse halter. Like the inflatable panels 62, 64, 66, 68, 72, 74, 76, 78 in first and second areas 30, 40 (FIGS. 2-4), inflatable panel 204 and inflatable cone 206 are connected to the inflation system 100 (shown connected by a coiled air line) that selectively inflates them based on a command(s) from control system 18 in response to a detected situation of vehicle instability. FIG. 9 shows the inflatable panel 204 and inflatable cone 206 in their non-deployed states. FIG. 10 shows the inflatable panel 204 and inflatable cone 206 in their deployed states or inflated states. The inflatable panel 204 may include multiple segments that collectively surround major surfaces of the horse's body, such as both sides and its back, to provide substantial body encapsulation by the panel(s) 204. Likewise, the inflatable cone 206 may include multiple segments that collectively surround major surfaces of the horse's head, such as above, below, and on both sides of its head and major portions of its neck, to provide substantial head and neck encapsulation by the cone(s) 206. Cone 206 differs from cones 132, 134 shown in FIGS. 5-6 in that cone(s) 206 defines a smallest diameter portion at the back of the cone(s) or toward the horse's body. A largest diameter portion of this version is defined at the front of the cone(s) or away from the horse's body.

Although the best mode contemplated by the inventors of carrying out the present invention is disclosed above, practice of the above invention is not limited thereto. It will be manifest that various additions, modifications, and rearrangements of the features of the present invention may be made without deviating from the spirit and the scope of the underlying inventive concept.

I claim:
1. A large animal hauling vehicle, comprising:
  an animal transport compartment in which a large animal is loaded for moving the animal while standing in the vehicle during a transportation session;
  a supplemental animal stability system, including:
  a support system having at least one deployable device, wherein the at least one deployable device defines a non-deployed state in which the least one deployable device does not contact the large animal during a stable phase of the transportation session and a deployed state in which the least one deployable device contacts the large animal to provide support during an instability phase of the transportation session; and
  a control system that is configured to:
    maintain non-contact of the at least one deployable device and the large animal during the stable phase of the transportation session;
    detect an instability condition of the vehicle during the transportation session; and
    selectively deploy the at least one deployable device from the non-deployed state to the deployed state in response to the detected instability condition of the vehicle during the transportation session.
2. The large animal hauling vehicle of claim 1, wherein the at least one deployable device is an inflatable panel.
3. The large animal hauling vehicle of claim 1, wherein:
  the animal transport compartment defines a compartment space in which the large animal stands during the transportation session, with the animal transport compartment including:
    a first side wall that defines a first side boundary of the compartment space;
    a second side wall that defines a second side boundary of the compartment space;
  the at least one deployable device includes:
    a first side inflatable cushion mounted in and deployable from first side wall into the compartment space toward the second side wall; and
    a second side inflatable cushion mounted in and deployable from second side wall into the compartment space toward the first side wall.
4. The large animal hauling vehicle of claim 3, wherein:
  the animal transport compartment further includes:
    a front wall that defined a front boundary of the compartment space;
  the at least one deployable device further includes:
    a front inflatable cushion mounted in and deployable from front wall into the compartment space toward a back portion of the compartment space.
5. The large animal hauling vehicle of claim 3, wherein the at least one deployable device includes a pair of deployable devices arranged at the first side wall and the second side wall; and the animal transport compartment is configured so that:
during the stable phase of the transportation session, the large animal stands freely side-to-side between and spaced from each of the first side wall and the second side wall in the compartment space; and during the instability phase of the transportation session, the large animal is supported between the first side wall and the second side wall by direct contact with the pair of deployable devices.

6. The large animal hauling vehicle of claim 1, wherein the control system further comprises:
at least one sensor that is configured to detect the instability condition of the vehicle; and
wherein:
the control system is configured to command deployment of the at least one deployable device in response to the detection of the instability condition of the vehicle.

7. The large animal hauling vehicle of claim 6, wherein:
the vehicle is a trailer; and
the instability condition is a back-and-forth trailer sway event.

8. The large animal hauling vehicle of claim 6, wherein:
the vehicle is a trailer; and
the instability condition is a crash event.

9. The large animal hauling vehicle of claim 1, wherein the at least one deployable device defines a wearable device that is includes at least one of an inflatable body support and an inflatable head support.

* * * * *